United States Patent [19]

Silverglate

[11] Patent Number: 4,753,520

[45] Date of Patent: Jun. 28, 1988

[54] COMPOUND CATOPTRIC CARTESIAN OVOID LENS

[75] Inventor: David E. Silverglate, Santa Cruz, Calif.

[73] Assignee: General Instrument Corp., New York, N.Y.

[21] Appl. No.: 931,069

[22] Filed: Nov. 17, 1986

[51] Int. Cl.[4] .............................................. G02B 3/02
[52] U.S. Cl. ..................................... 350/443; 250/239
[58] Field of Search ......................... 350/443; 250/239

[56] References Cited

PUBLICATIONS

Southall; Mirrors, Prisms and Lenses; The MacMillian Co., 1923; pp. 617–625.

Huygens; Treatise on Light; Dover Publications, Inc., 1978: Translated by Thompson in 1912; pp. 104–115.

Primary Examiner—John K. Corbin
Assistant Examiner—Rebecca D. Gass
Attorney, Agent, or Firm—James & Franklin

[57] ABSTRACT

A substantially solid transparent molded plastic body focuses light from an internal point to a point external to the body. The body has a center section with a surface having the curvature of a Cartesian Ovoid of revolution and a peripheral section. The peripheral section includes an inner refracting surface in the shape of a diverging truncated cone whose apex substantially coincides with the internal point and an outer reflecting surface in the shape of a polynomial curve of revolution. The slope of the outer surface causes it to reflect light rays between the refractory inner surface and the internal point. A light source such as an LED, or a photo-detector, may be immersed in the body at the internal point.

28 Claims, 6 Drawing Sheets

COMPOUND CATOPTRIC CARTESIAN OVOID LENS

The present invention relates to lenses which can be effectively employed in conjunction with a light source and/or a photo-detector for use in relatively inexpensive high resolution optical scanners, illuminators, detectors, sensors, optoisolators, optical switches, or the like and, more particularly, to a plastic molded lens with a central section having a surface in the shape of a truncated Cartesian Ovoid of revolution and a peripheral section having an inner refracting surface and an outer reflecting surface.

Lenses of various materials and shapes have been used to focus light for centuries. Glass and, more recently, transparent plastic materials have been formed into bodies with various surface configurations to perform specific tasks such as focusing light on a point or collimating light from a point source.

Centuries ago, Christiaan Huygens wrote a treatise entitled "On Light." In that treatise, Huygens included a chapter on the properties of certain transparent bodies in which he discloses a particuar body in the form of an ovoid of revolution, known as a "Cartesian Ovoid", named after Renee Des Cartes. The Cartesian Ovoid is a theoretical transparent body which has a surface capable of reassembling light rays emanating from a first point source such that they converge on a second point. Both of the points are located on a single optical axis, one internal to the body and the other external.

The theory of the Cartesian Ovoid is explained by Huygens and, hence, has been known by mathematicians and physicists for many years. It has, however, been impossible to put this theory to practical use as a lens for a light source because, in order to implement the theory, it is necessary that the light source be totally immersed within the solid body of the lens. A light source which is also heat generating, however, cannot be immersed in a solid non-heat-conducting body, because the heat generated by the light source cannot be dissipated. Accordingly, heat build-up results and, within a relatively short time, the light source is destroyed by overheating.

Recently, light sources in the form of light emitting diodes (LEDs) have been developed which generate only minimal heat. It is therefore now possible to wholly immerse an LED within a solid non-heat-conducting plastic body. The leads will conduct the small amount of heat generated by the LED to the outside of the body. Consequently, an immersed light source can be utilized in a solid plastic lens body. This is explained in greater detail in my copending application entitled "Immersion Cartesian Ovoid Lens", Ser. No. 933,383, filed Nov. 21, 1986.

In general, the aforementioned application discloses an inexpensive lens which includes a solid plastic transparent body with a Cartesian Ovoid surface having a light emitting diode wholly immersed therein at a point which will permit the lens to focus the light generated by the LED onto a particular external point. The external point may be, for example, a photo-detector of the fiber optic type. In addition, a second lens can be used with an immersed photo-detector. The combination can form an excellent optoisolator, optical switch or reflective optical detector, particularly if the geometry of the system is properly selected. For example, the source lens can produce a relatively narrow output cone angle whereas the receiving lens can have a relatively wide acceptance angle.

The present invention further improves the Cartesian Ovoid lens by combining same with a peripheral lens section including an inner refracting surface and an outer reflecting surface. In this way, light entering or leaving the lens at an angle greater than that which can be redirected by the Cartesian Ovoid central section can be collected and focused.

It is, therefore, a prime object of the present invention to provide an inexpensive compound catoptric Caresian Ovoid lens which can be used with an immersed light emitting diode or photo-detector.

It is another object of the present invention to provide a compound catoptric Cartesian Ovoid lens capable of collecting and focusing light entering or leaving the lens at relatively large angles.

It is another object of the present invention to provide a compound catoptric Cartesian Ovoid lens which can be used for high resolution illumination or detection.

It is another object of the present invention to provide a compound catoptric Cartesian Ovoid lens which can be utilized for both emitting and detecting in an optical scanner, optoisolator, optical switch, or reflective optical detector.

It is another object of the present invention to provide a compound catoptric Cartesian Ovoid lens wherein the geometry can be designed to obtain the maximum focused light output at a narrow output cone angle.

It is another object of the present invention to provide a compound catoptric Cartesian Ovoid lens wherein the geometry can be designed to obtain the maximum focused light input at a large acceptance cone angle.

To these and to such other objects as may hereinafter appear, the present invention relates to a compound catoptric Cartesian Ovoid lens, as described in the following specification and receited in the annexed claims, taken together with the accompanying drawings, wherein like numerals refer to like parts, and in which:

Figure 1:
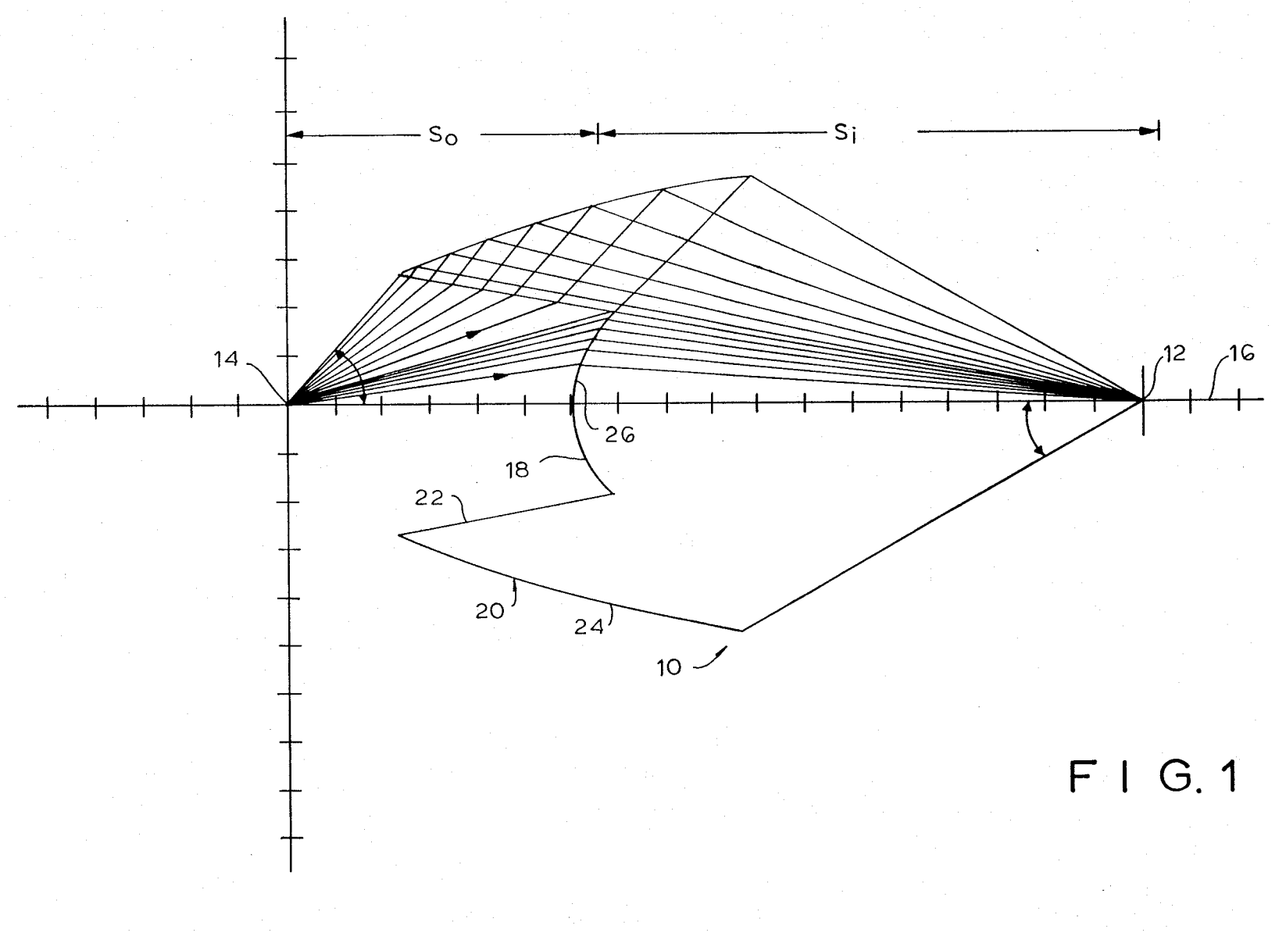
FIG. 1 illustrates a first preferred embodiment of the compound catoptric Cartesian Ovoid lens of the present invention.
Figure 2:
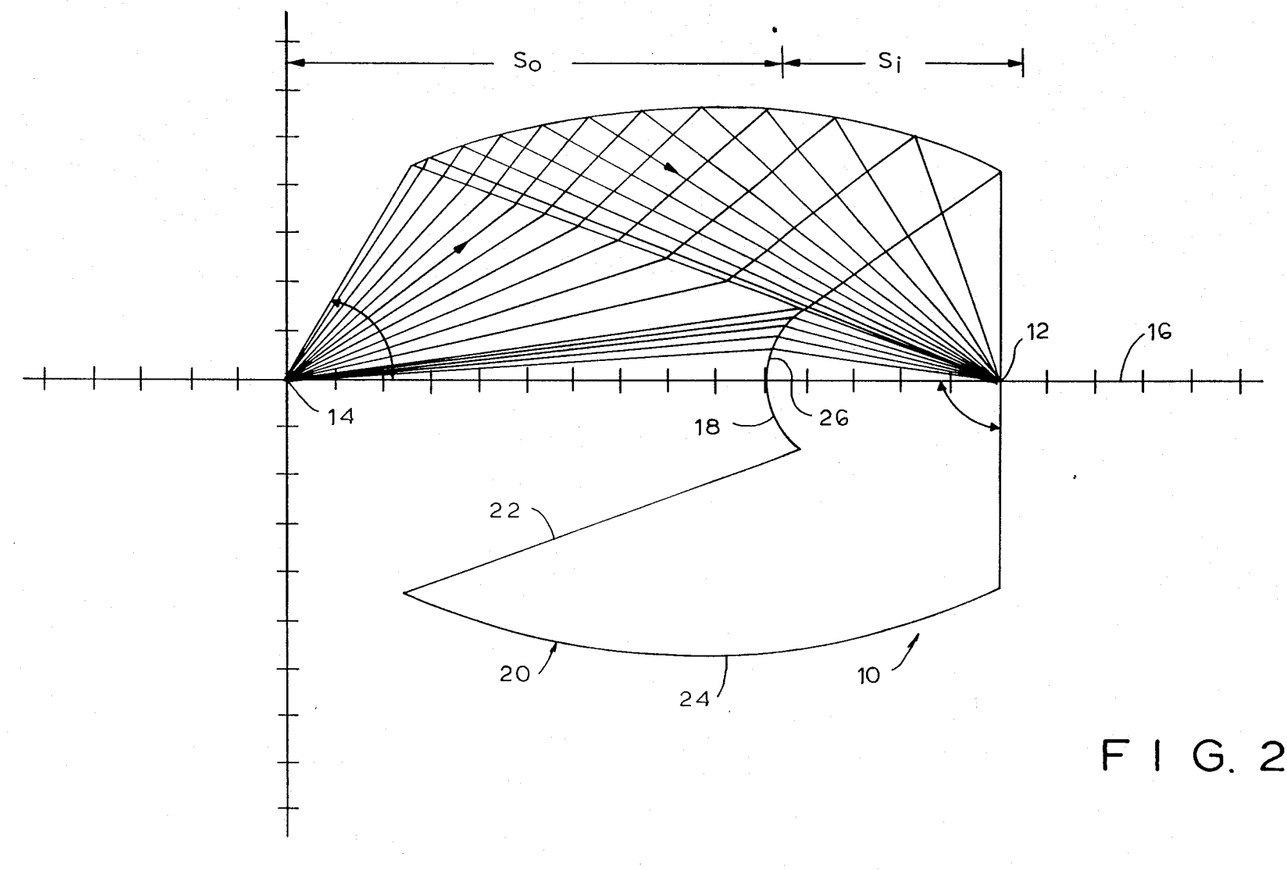
FIG. 2 illustrates a second preferred embodiment of the compound catoptric Cartesian Ovoid lens of the present invention.
Figure 3:
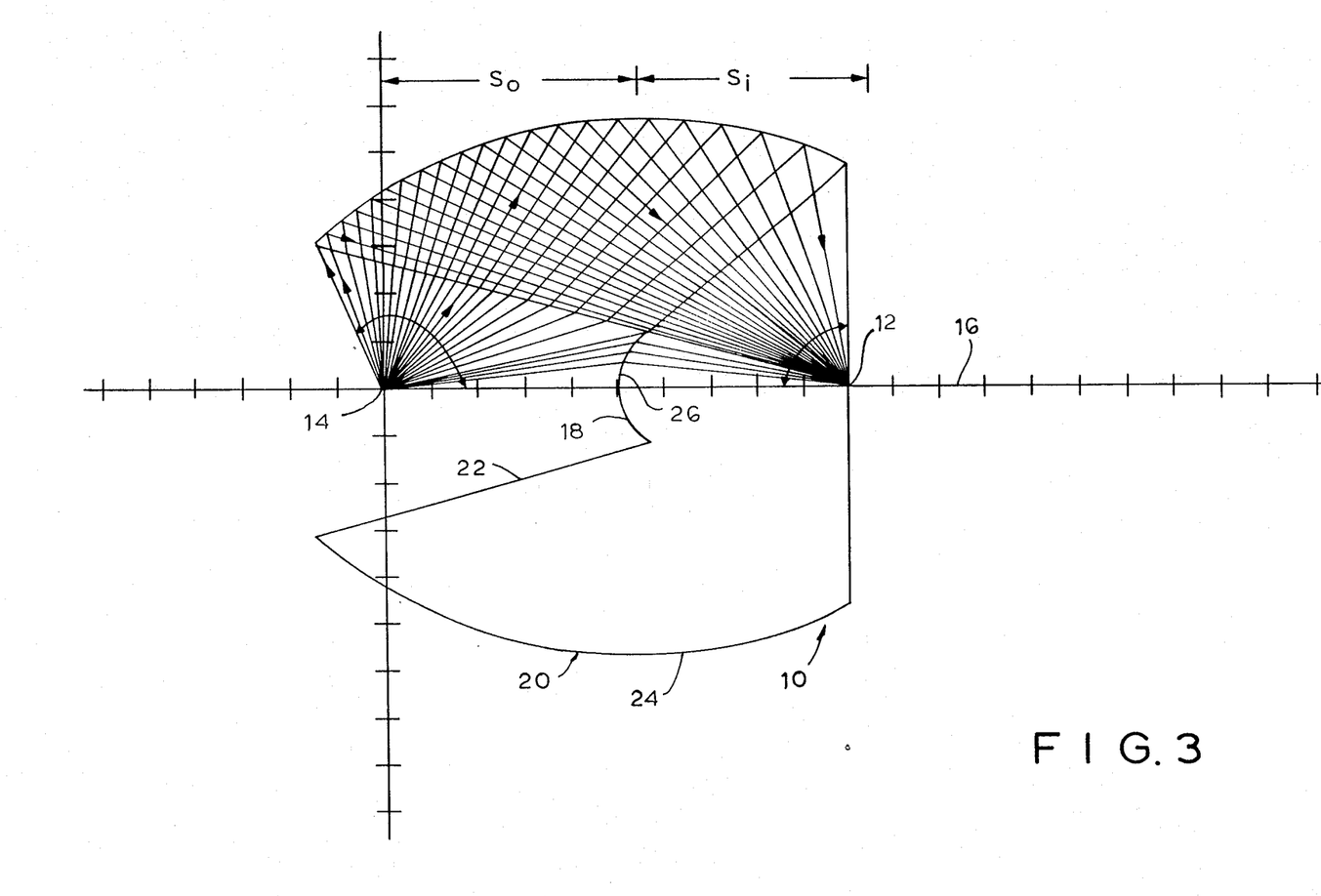
FIG. 3 illustrates a third preferred embodiment of the compound catoptric Cartesian Ovoid lens of the present invention.

FIGS. 1, 2 and 3 show different preferred embodiments of a compound catoptric Cartesian Ovoid lens in accordance with the present invention which can be utilized either as a focusing emitter or a focusing detector. Such lenses may be useful in illuminating and detecting small spots in currency validators, bar code readers, optical scanners, and for "landing" light from an optical fiber into a light detector. In each case, the lens includes a transparent solid body, generally designated 10, preferably composed of substantially non-heat-conducting molded plastic transparent material. Body 10 acts to collect and focus light between an internal point 12 and an external point 14, both of which are located on an optical/ mechanical axis 16. Body 10 has a central section 18 and a peripheral section, generally designated 20. Peripheral section 20 has an inner refracting surface 22 and an outer reflecting surface 24.

Central section 18 has a surface in the form of a Cartesian Ovoid of revolution in accordance with the formula: $L_o \times N_o + L_i \times N_i =$ Constant, where:

$L_o$ is the distance between external point 14 and a point 26 on the surface of central section 18;

$L_i$ is the distance between point 26 on the surface of central section 18 and internal point 12;

$N_o$ is the index of refraction in air; and $N_i$ is the index of refraction in the plastic material of which body 10 is formed.

The Cartesian Ovoid is truncated at or before the point where total internal refraction occurs.

Inner refracting surface 22 is in the form of a diverging truncated cone whose apex is at point 12. Surface 22 act begins where the Cartesian Ovoid surface of central section 18 ends.

Outer reflecting surface 24 is a polynomial curve of revolution about optical axis 16. This curve is determined by the desired maximum rear acceptance angle at point 12, the distance from point 14 to the lens along the optical axis, the distance from the lens surface to point 12 along the optical axis, and is calculated to have a slope which will reflect light rays between the inner surface 22 and point 12. Thus, the polynomial curve is selected such that all light rays generated at point 14 and refracted at surface 22 will be reflected and focused at point 12. The mathematical formula for this surface varies depending upon the geometry of the body but can be obtained by one skilled in the art since the other parameters are designated. A surface with the shape of an ellipse often provides excellent results. Surface 20 may be coated with a reflective material to improve reflections when incident angles are less than the critical angle.

The shape of the body causes light rays to be collected and focused between point 12 and point 14. For example, if a point light source is located at point 14 and a detector is located at point 12, the light rays leaving point 14 on the optical axis outside the body at a small angle from axis 16 would be refracted at the lens surface and then focused on the detector at point 12. Rays leaving point 14 at larger angles hit the peripheral part of the lens, are refracted at inner surface 22 and then undergo internal reflection on outer surface 24 of the body. They are then focused onto the detector at point 12.

The maximum angle at which the light rays leave point 14 and eventually are focused on point 12 can be chosen. For example, FIG. 1 shows a lens with an emitting angle of approximately 50° and a detecting angle of approximately 30°, whereas FIG. 2 shows a lens with an emitting angle of approximately 60° and a detecting angle of approximately 90°. FIG. 3 shows a lens with an emitting angle of approximately 115° and a detecting angle of approximately 90°.

The lens of the present invention can be optimized to efficiently collect and/or focus light in a given application by varying the geometry. Thus, the lens diameter, the detector size, the Cartesian Ovoid cut-off point, the minimum distance ($S_o$) between external point 14 and point 26 on the lens surface and the minimum distance ($S_i$) between point 26 on the lens surface and internal point 12 and the ratio thereof all determine the properties of the lens. In general, the smaller the ratio of $S_o/S_i$, the smaller the emitter angle; the larger the ratio, the larger the emitter angle.

For example, in FIG. 1, the minimum distance ($S_o$) between external point 14 and surface point 26 is 6, and the minimum distance ($S_i$) between surface point 26 and internal point 12 is 12. Thus, $S_o \times N_o + S_i \times N_i = 24.36$, $S_o/S_i = 0.5$, and $S_o + S_i = 18$. This geometric configuration results in an emitting angle of about 50° at point 14 and an acceptance angle of approximately 30° at point 12.

In FIG. 2, the minimum distance $S_o$ between external point 14 and surface point 26 is 10 and the minimum distance $S_i$ between surface point 26 and internal point 12 is 5. Thus, $S_o \times N_o + S_i \times N_i = 17.65$, $S_o/S_i = 2$, and $S_o + S_i = 15$. This geometric configuration results in an emitting angle of approximately 60° and a detecting angle of approximately 90°.

In FIG. 3, the minimum distance $S_o$ from point 14 to point 26 is 5 and the minimum distance between point 18 and point 12 is also 5. Thus, $S_o \times N_o + S_i \times N_i = 12.65$, $S_o/S_i = 1$, and $S_o + S_i = 10$. In this instance, the emitting angle at point 14 is 115° and the acceptance angle at point 12 is 90°.

It should be understood that while FIGS. 1, 2 and 3 are described as being utilized in conjunction with an immersed detector, these lens bodies operate precisely the same way when used as illuminators with a light emitting diode immersed at internal point 12. In that case, light emitted from internal point 12 will be focused on external point 14. However, it may be necessary to alter the geometry of the lens body such that the emitting angle at point 12 is greater than the detecting angle at point 14.

Figure 4:
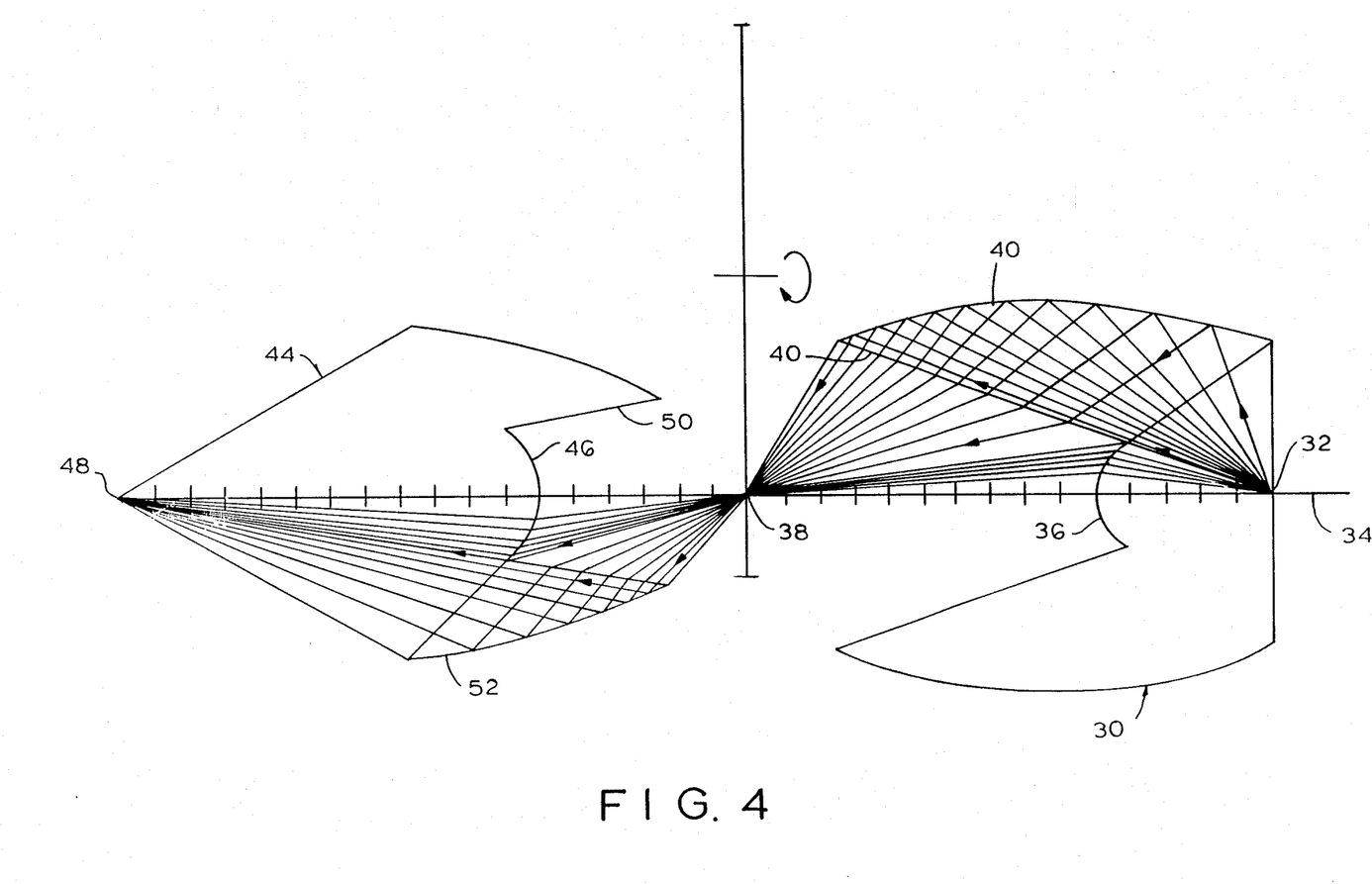
FIG. 4 discloses a focusing emitter confocally coupled to a detector, each enclosed within a compound catoptric Cartesian Ovoid lens body, in accordance with the present invention.
Figure 5:
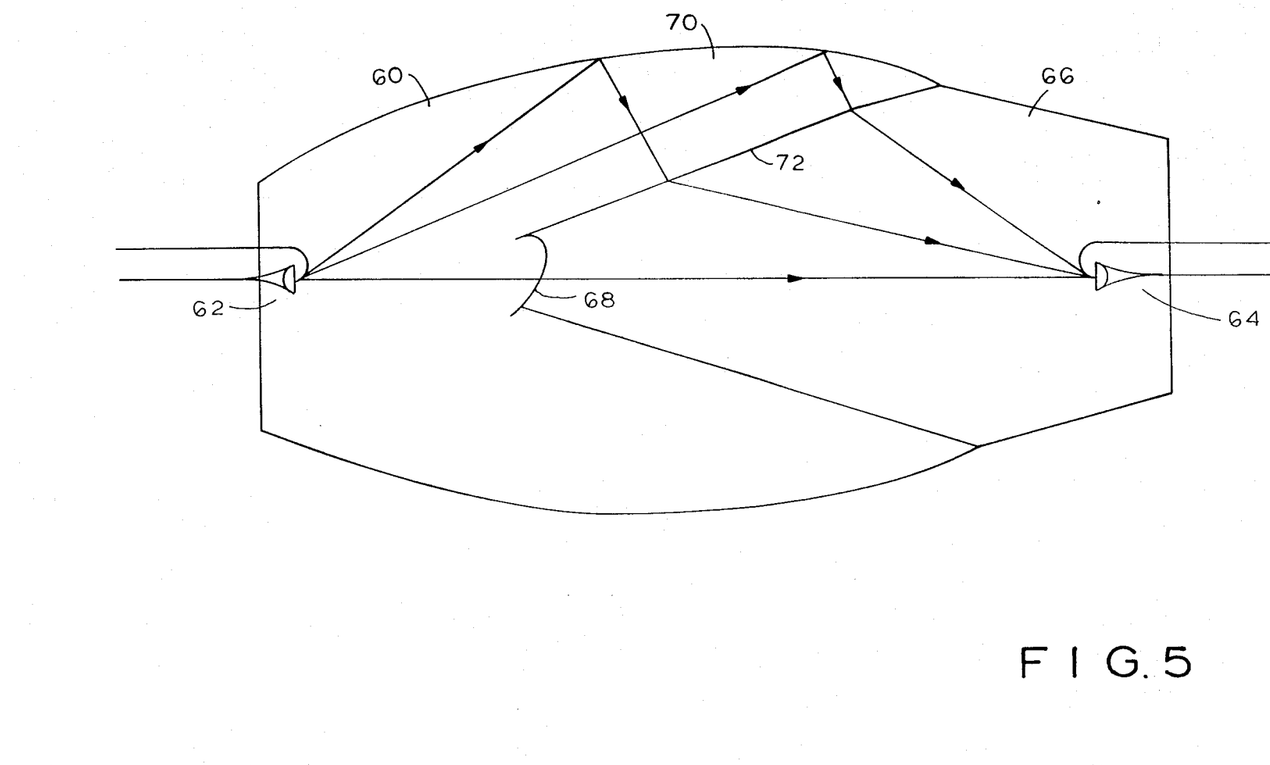
FIG. 5 illustrates a focusing emitter coupled to a detector in different refractive index material immersed in compound catoptric Cartesian Ovoid lenses in accordance with the present invention.
Figure 6:
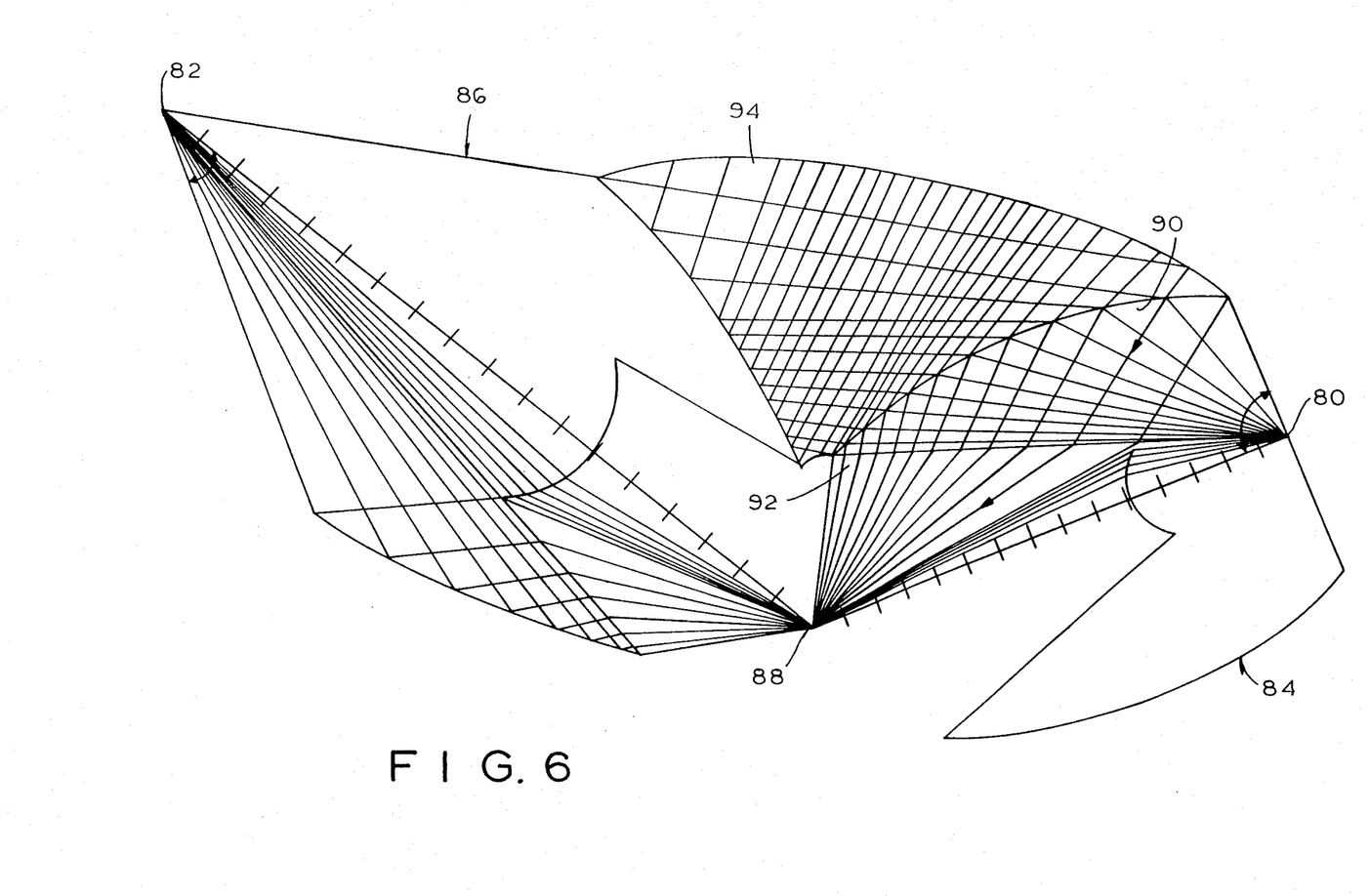
FIG. 6 is a focusing emitter/detector pair immersed in a doublet compound catoptric Cartesian Ovoid lens body, in accordance with the present invention.

FIGS. 4, 5 and 6 illustrate practical applications for the compound catoptric Cartesian Ovoid lens of the present invention. For example, FIG. 4 illustrates a focusing emitter in a lens body in accordance with the present invention confocally coupled to a detector in a separate lens body in accordance with the present invention. Such a combination can be used in a high resolution inexpensive and highly efficient slotted optoswitch, a reflective optic sensor, an optocoupler or an optoisolator.

As shown in FIG. 4, two lens bodies, generally designated 30 and 44, respectively, are provided. Lens body 30 is provided with an immersed LED at point 32 on optical axis 34. Light emitted at a relatively small angle from point source 32 passes through the central portion 36 of the lens which has a curvature of a Cartesian Ovoid and is focused on external point 38. Light emitted at a greater angle from point source 32 is reflected from outer surface 40 on the peripheral section of body 30 and then refracted through surface 42 and focused on external point 38.

The light passing through external point 38 at a relatively small angle with respect to optical axis 34 passes through the central portion 46 of body 44 and is focused on internal point 48. Surface 44 has a curvature of a Cartesian Ovoid of revolution. Light passing through point 38 at a greater angle with respect to optical axis 34 is refracted by inner surface 50 of body 44 and then reflected by outer surface 52 so that it is also focused on internal point 48.

The emitter and detector are electrically and physically isolated from each other in two separate transparent optical lens/reflector bodies that efficiently couple light flux from the emitter to the detector. The detector's lens/reflector body can be designed such that the light rays focus on the detector in a narrow light cone. This makes for a high resolution apparatus.

Instead of facing each other, the lens bodies of FIG. 4 can be directed at the same point on a reflective object so as to form a high resolution reflective object sensor. The arrangement can be such that the emitter's wide output angle can converge in a narrow incident light cone on the detector.

FIG. 5 shows a focusing emitter coupled to a detector in a different refractive index material immersed in a lens/reflector body. Such a configuration can be used as an optocoupler or an optoisolator in an inexpensive and efficient package.

In this case, the emitter and detector are electrically isolated from each other in a single transparent optical body that efficiently couples light flux from the emitter to the detector. The body includes a first part 60 with a refractive index of $N_1$. An LED 62 is immersed within part 60 on the optical axis. A detector 64 is immersed on the optical axis within a second part 66 having an index of refraction of $N_2$. The shape of the body is such that light rays leaving the body at small angles to the optical mechanical axis are focused onto detector 64 by refraction at the front surface 68. Large angle light rays undergo an internal reflection on the side surface 70 of the body and then are refracted at interface 72 so as to be focused on detector 64.

Light leaving the emitter in all direction (i.e., a large solid angle, even a hemisphere or more) is effectively coupled to the detector. The arrangement can be such that the emitter's wide output angle can converge in a narrow incident light cone on the detector.

FIG. 6 shows a focusing emitter detector pair immersed in a doublet lens/reflector body. This configuration is used for high resolution illumination and detection of small spots for currency validators, bar code readers and other optical pattern recognition applications. A light emitting diode (LED) 80 and a separate light sensitive detector 82 are immersed in a plastic optical doublet lens/reflector body including parts generally designated 84 and 86, respectively. The shape of the body causes small angle light rays to be focused on a spot 88 at a specific distance from the lens surface. Larger angle rays hit the outer surface 90 of the peripheral portion of the lens and are internally reflected, then hit the internal surface 92 of the peripheral portion of the lens and are refracted, and finally exit the body and are focused on point 88. The maximum angle light ray leaving the emitter lens that will be incident on point 88 can be chosen depending upon the angular radiant characteristics of the emitter.

The body becomes a double humped "doublet". The emitter part can be designed to collect as much flux exiting LED as possible and focus it on spot 88. The detector part 86 is focused on the same spot 88, but can be designed for shallow angle rays to be incident to the detector, keeping reflection losses low. The emitter and detector parts can be attached by molding, gluing or locking together with an external snap, slide, case or frame. The emitter or detector part may be complete along its axis of revolution or sliced and merged together.

A barrier 94 can also be situated in the body between the emitter and detector parts to decrease cross-talk between them. Some cross-talk (DC only) can help in some applications by keeping the detector active with a DC bias provided by the enabling emitter. The emitter sends light to a focused spot and the illuminated spot then re-radiates light back into the lens and some of this light strikes the detector.

The size and distance apart of the emitter and detector parts are an important variable in the resolution of the system. Other variables include the distance from the emitter to the lens surface, the distance from the lens surface to the illuminated spot, the ratio of emitter size to lens diameter, and percent internal reflection of the first lens surface before truncating.

It should now be appreciated that the present invention relates to a compound catroptric Cartesian Ovoid lens which is capable of focusing and collecting light leaving and/or entering at both relatively small and relatively large angles. The lens includes a body having a central portion with a curvature of a truncated Cartesian Ovoid of revolution and a peripheral section having an inner refractive surface and an outer reflective surface. The inner refractive surface is preferably in the form of a diverging truncated cone whose apex is at the internal body point. The outer reflecting surface has a polynomial curve of revolution such that all light incident thereto is reflected between the inner refracting surface and the internal point. By appropriately adjusting the geometric dimensions of the lens, narrow emittance angles and wide detection angles can be achieved. Accordingly, various applications for the lens of the present invention, either used singularly or in pairs, are apparent.

While only a limited number of preferred embodiments of the present invention have been disclosed herein for purposes of illustration, it is obvious that many variations and modifications could be made thereto. It is intended to cover all of these variations and modifications which fall within the scope of the present invention, as defined by the following claims:

I claim:

1. Compound lens means having a substantially solid transparent body for focusing light between a point on the optical axis internal to said body and a point on the optical axis external to said body, said body being composed of a given material and having a center section and a peripheral section, said center section having a surface with a curvature substantially in accordance with:

$$L_o \times N_o + L_i \times N_i = Constant$$

where:
- $L_o$ is the distance from a point on said surface to said external point;
- $L_i$ is the distance from said point on said surface to said internal point;
- $N_o$ is the index of refraction in air;
- $N_i$ is the index of refraction of said given material;

and said peripheral section comprising an inner refracting surface and an outer reflecting surface.

2. The lens means of claim 1, wherein said inner refracting surface has the shape of a diverging truncated cone whose apex substantially coincides with said internal part.

3. The lens means of claim 1, wherein said outer reflecting surface has a slope which reflects light rays between said refracting inner surface and said internal point.

4. The lens means of claim 1, wherein said outer reflecting surface has the shape of a polynomial curve of revolution.

5. The lens means of claim 4, wherein said polynomial is an ellipse.

6. The lens means of claim 1, further comprising a light source located at one of said points.

7. The lens means of claim 5, wherein said light source is an LED immersed in said body.

8. The lens means of claim 1, further comprising a light detector at one of said points.

9. The lens means of claim 1, wherein $S_o$ equals the minimum $L_o$; $S_i$ equals the minimum $L_i$; and wherein $S_o/S_i$ is as large as possible.

10. The lens means of claim 1, wherein $S_o$ equals the minimum $L_o$; $S_i$ equals the minimum $L_i$; and wherein $S_o/S_i$ is as small as possible.

11. The means of claim 1, wherein said material is plastic.

12. Apparatus for detecting light emitted from a source comprising first and second light focusing means, each of said light focusing means comprising a substantially solid body for focusing light between a point on the optical axis internal to said body and a point on the optical axis external to said body, said body being composed of a given material and having a center section and a peripheral section, said center section having a surface with a curvature substantially in accordance with:

$$L_o \times N_o + L_i \times N_i = Constant$$

where:
  $L_o$ is the distance from a point on said surface to said external point;
  $L_i$ is the distance from said point on said surface to said internal point;
  $N_o$ is the index of refraction in air;
  $N_i$ is the index of refraction of said given material;
said peripheral section comprising an inner refracting surface and an outer reflecting surface, an LED located at said internal point and immersed in said body of said first light focusing means and a light detector located at said internal point in said body of said second light focusing means, said external point of said first light focusing means and said external point of said second light focusing means being substantially coinciding.

13. The apparatus of claim 12, wherein said inner refracting surface has the shape of a diverging truncated cone whose apex substantially coincides with said internal point.

14. The apparatus of claim 12, wherein said outer reflecting surface has a slope which reflects light rays between said refracting inner surface and said internal point.

15. The apparatus of claim 12, wherein said outer reflecting surface has the shape of a polynomial curve of revolution.

16. The apparatus of claim 14, wherein said polynomial is an ellipse.

17. The apparatus of claim 12, wherein said first means has a wide output angle.

18. The apparatus of claim 12, wherein said second light focusing means has a narrow input angle.

19. The apparatus of claim 12, wherein $S_o$ equals the minimum $L_o$, $S_i$ equals the minimum $L_i$ and wherein $S_o/S_i$ is as small as possible for said second light focusing means.

20. The apparatus of claim 12, wherein $S_o$ equals the minimum $L_o$, $S_i$ equals the minimum $L_i$, and wherein: $S_o/S_i$ is as large as possible for said first light focusing means.

21. The apparatus of claim 12, wherein said external point is on an object and the detected light is reflected from said object.

22. The apparatus of claim 12, wherein said given material is plastic.

23. The apparatus of claim 12, further comprising means for joining said first light focusing means and said second light focusing means.

24. Apparatus for detecting light emitted from a source comprising first and second adjacent light focusing means, said first light focusing means comprising a substantially solid body for focusing light from an immersed LED on a point on the optical axis internal to said body to a point on the optical axis within said second light focusing means, said body of said first light focusing means being composed of a first substantially non-heat-conducting material and having a center section and a peripheral section, said center section having a surface with a curvature substantially in accordance with:

$$L_1 \times N_1 + L_2 \times N_2 = Constant$$

where:
  $L_1$ is the distance from said LED to said point on said surface;
  $L_2$ is the distance from a point on said surface to said point within said second light focusing means;
  $N_1$ is the index of refraction of first material;
  $N_2$ is the index of refraction of the material of the body of said second light focusing means;
said peripheral section comprising an inner refracting surface and an outer reflecting surface, said second focusing means substantially filling the space defined by said center surface and said peripheral section and further comprising light detector means located on said optical axis internal to said body of said second focusing means.

25. The apparatus of claim 24, wherein said inner refracting surface has the shape of a diverging truncated cone whose apex substantially coincides with said internal point.

26. The apparatus of claim 24, wherein said outer reflecting surface has a slope which reflects light rays between said refracting inner surface and said internal point.

27. The apparatus of claim 24, wherein said outer reflecting surface has the shape of a polynomial curve of revolution.

28. The apparatus of claim 25, wherein said polynomial is an ellipse.

* * * * *